(12) United States Patent
Nakano et al.

(10) Patent No.: US 10,600,250 B2
(45) Date of Patent: Mar. 24, 2020

(54) DISPLAY SYSTEM, INFORMATION PRESENTATION SYSTEM, METHOD FOR CONTROLLING DISPLAY SYSTEM, COMPUTER-READABLE RECORDING MEDIUM, AND MOBILE BODY

(71) Applicant: Panasonic Intellectual Property Management Co., Ltd., Osaka (JP)

(72) Inventors: Nobuyuki Nakano, Osaka (JP); Tadashi Shibata, Osaka (JP); Masanaga Tsuji, Osaka (JP); Akira Tanaka, Osaka (JP); Shohei Hayashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/016,694

(22) Filed: Jun. 25, 2018

(65) Prior Publication Data

US 2019/0005726 A1    Jan. 3, 2019

(30) Foreign Application Priority Data

Jun. 30, 2017 (JP) .................................. 2017-129896

(51) Int. Cl.
*G06T 19/00* (2011.01)
*G06K 9/00* (2006.01)
*G08G 1/16* (2006.01)

(52) U.S. Cl.
CPC ........ *G06T 19/006* (2013.01); *G06K 9/00805* (2013.01); *G08G 1/16* (2013.01);
(Continued)

(58) Field of Classification Search
None
See application file for complete search history.

(56) References Cited

U.S. PATENT DOCUMENTS

| 2011/0128139 | A1* | 6/2011 | Tauchi | ................... | B60K 35/00 340/439 |
| 2012/0242694 | A1* | 9/2012 | Hotta | ..................... | G02B 27/01 345/633 |

(Continued)

FOREIGN PATENT DOCUMENTS

JP    6-215300    8/1994

*Primary Examiner* — David H Chu
(74) *Attorney, Agent, or Firm* — Greenblum & Bernstein, P.L.C.

(57) ABSTRACT

A display system for use in a mobile body includes an acquisition unit that acquires detection information of at least one detection object that exists in a target space, a display unit that displays a virtual image in the target space, and a controller that controls display of the display unit. In the target space, at least one detection area is provided. The at least one detection object includes a first detection object that exists closest to the mobile body and a second detection object that has the shortest time to collision with the mobile body. The controller determines, as a display object, at least one of the first detection object and the second detection object in the at least one detection object that exists in the detection area based on the detection information, and causes the display unit to display the virtual image corresponding to the display object.

16 Claims, 10 Drawing Sheets

(52) U.S. Cl.
CPC ............ *G08G 1/163* (2013.01); *G08G 1/165* (2013.01); *G08G 1/166* (2013.01)

(56) References Cited

U.S. PATENT DOCUMENTS

| | | | |
|---|---|---|---|
| 2014/0354684 A1* | 12/2014 | Beckwith | G06F 3/011 345/633 |
| 2015/0291160 A1* | 10/2015 | Kim | B60W 30/16 345/633 |
| 2016/0063761 A1* | 3/2016 | Sisbot | B60W 50/14 345/633 |
| 2016/0163108 A1* | 6/2016 | Kim | G02B 27/0101 345/633 |
| 2017/0109940 A1* | 4/2017 | Guo | G06T 19/20 |
| 2017/0161009 A1* | 6/2017 | Ogisu | B60K 35/00 |
| 2017/0273161 A1* | 9/2017 | Nakamura | H05B 37/0227 |
| 2018/0012374 A1* | 1/2018 | Fujita | G03B 7/091 |
| 2018/0156913 A1* | 6/2018 | Baba | G01S 7/411 |
| 2018/0157036 A1* | 6/2018 | Choi | G02B 27/0101 |

* cited by examiner

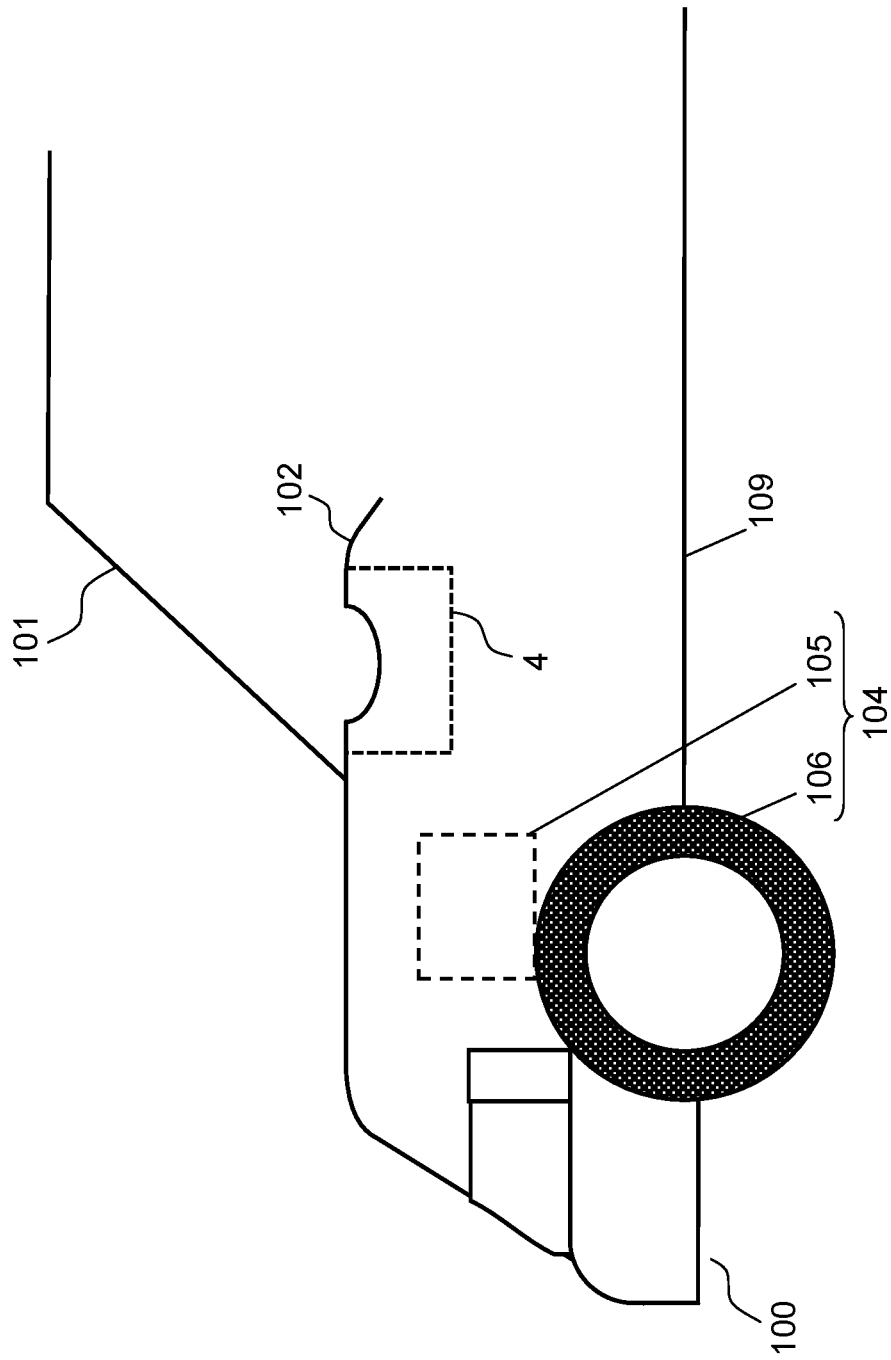

DISPLAY SYSTEM, INFORMATION PRESENTATION SYSTEM, METHOD FOR CONTROLLING DISPLAY SYSTEM, COMPUTER-READABLE RECORDING MEDIUM, AND MOBILE BODY

The present application claims the benefit of foreign priority of Japanese patent application 2017-129896 filed on Jun. 30, 2017, the contents all of which are incorporated herein by reference.

BACKGROUND

1. Technical Field

The present disclosure relates to a display system, an information presentation system, a method for controlling a display system, a computer-readable recording medium, and a mobile body, and particularly to a display system that displays a virtual image in a target space, an information presentation system, a method for controlling a display system, a computer-readable recording medium, and a mobile body.

2. Background Art

A conventional dangerous situation warning device that is configured with a vehicle neighborhood object detection device for detecting an object on a front travel area, a danger latent area determination device for determining a danger latent area in which danger is latent, a danger degree processing device, and a warning output device has been known as a device installed on a vehicle (for example, Unexamined Japanese Patent Publication No. H6-215300). The danger degree processing device checks object information obtained by the vehicle neighborhood object detection device against the danger latent area obtained by the danger latent area determination device to determine a degree of danger with respect to an object which exists in the danger latent area. When the vehicle neighborhood object detection device detects a plurality of obstacles on the front travel area, the danger degree processing device sets the degree of danger for each of the obstacles and the warning output device displays the degree of danger for each of the obstacles.

SUMMARY

The present disclosure provides a display system, an information presentation system, a method for controlling a display system, a computer-readable recording medium, and a mobile body that make display easy for a user to understand.

An aspect of the present disclosure provides a display system for use in a mobile body. The display system includes an acquisition unit that acquires detection information of at least one detection object that exists in a target space, a display unit that displays a virtual image in the target space, and a controller that controls display of the display unit. In the target space, at least one detection area is provided in a lateral line that intersects with each of a longitudinal line and a vertical line. The at least one detection object includes a first detection object that exists closest to a mobile body and a second detection object that has the shortest time to collision with the mobile body. The controller determines, as a display object, at least one of the first detection object and the second detection object in the at least one detection object that exists in the detection area based on the detection information, and causes the display unit to display the virtual image that corresponds to the display object.

An information presentation system according to another aspect of the present disclosure includes a display system and a detection system that detects a detection object in a target space. An acquisition unit acquires detection information from the detection system.

A method for controlling a display system according to still another aspect of the present disclosure is a method for controlling a display system for use in a mobile body that includes an acquisition unit that acquires detection information of at least one detection object that exists in a target space, a display unit that displays a virtual image in the target space, and a controller that controls display of the display unit. In the target space, at least one detection area is provided in a lateral line that intersects with each of a longitudinal line and a vertical line. The at least one detection object includes a first detection object that exists closest to a mobile body and a second detection object that has the shortest time to collision with the mobile body. The method for controlling a display system determines, as a display object, at least one of the first detection object and the second detection object in the at least one detection object that exists in the detection area based on the detection information. The controller causes the display unit to display the virtual image that corresponds to the display object.

A computer-readable recording medium according to still another aspect of the present disclosure is a non-transitory computer-readable recording medium storing a program causing a computer system to execute a method for controlling a display system.

A mobile body according to still another aspect of the present disclosure includes a body, a display system installed on the body, a reflection member that is fixed to the body and that reflects light emitted from a display unit to display a virtual image in a target space, and a drive unit that moves the body.

According to the present disclosure, a display system, an information presentation system, a method for controlling a display system, a computer-readable recording medium, and a mobile body that make display easy for a user to understand are provided.

BRIEF DESCRIPTION OF DRAWINGS

FIG. 10 is a conceptual diagram of another view point of a vehicle having a display system according to the exemplary embodiment of the present disclosure.

DETAILED DESCRIPTION

Prior to describing an exemplary embodiment of the present disclosure, problems found in a conventional technique will be now briefly described herein. In the dangerous situation warning device disclosed in Unexamined Japanese Patent Publication No. H6-215300, the warning output device (a display system) displays degrees of danger for a plurality of obstacles, and thus there is a problem that a user (for example, a driver of a mobile body) is hard to understand to which display should be paid attention.

Exemplary Embodiment (1) Outline

Figure 1:
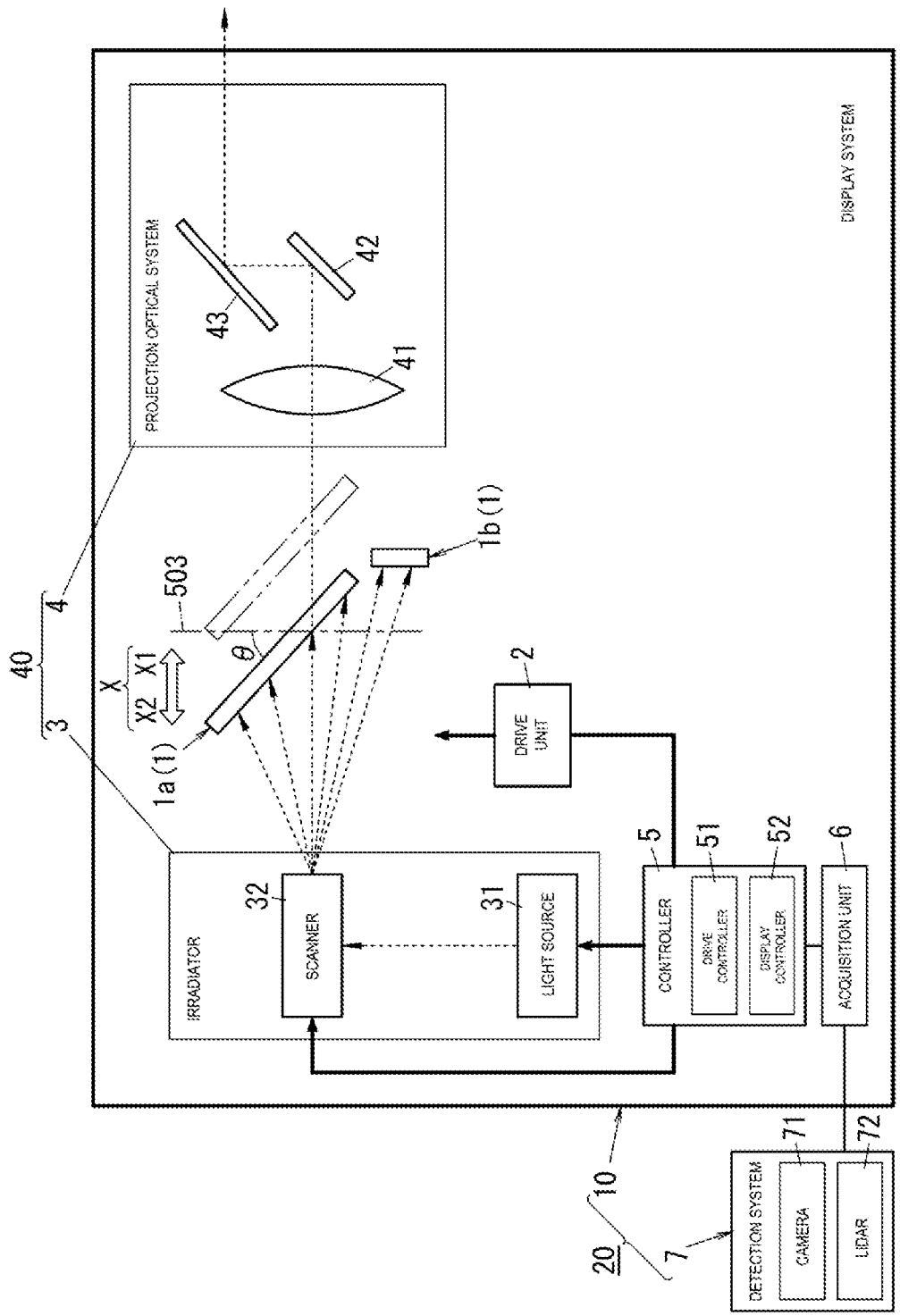
FIG. 1 is a conceptual diagram illustrating a configuration of an information presentation system according to an exemplary embodiment of the present disclosure.

As shown in FIG. 1, display system 10 according to the exemplary embodiment includes acquisition unit 6 that acquires detection information of a detection object that exists in a target space, display unit 40 that displays (projects) a virtual image in the target space, and controller 5 that controls display unit 40. Acquisition unit 6, display unit 40, and controller 5 will be described in detail in "(2) Configuration".

Figure 2:
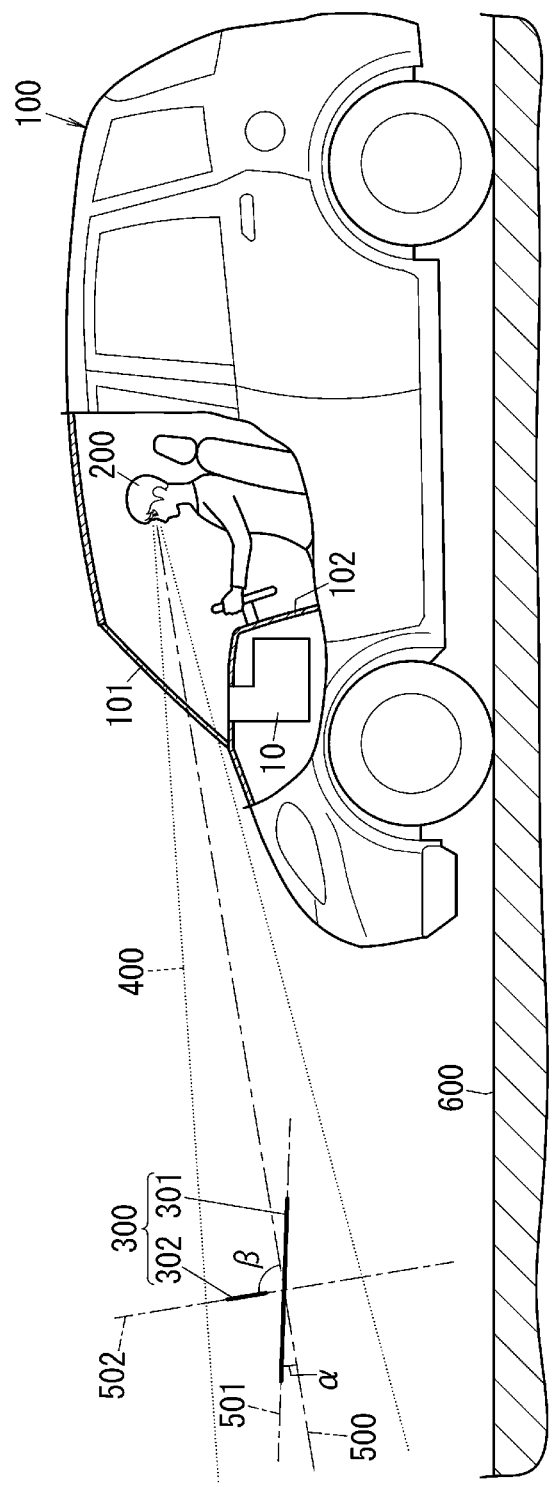
FIG. 2 is a conceptual diagram of a vehicle having a display system according to the exemplary embodiment of the present disclosure.

As shown in FIGS. 2 and 10, display system 10 according to the exemplary embodiment is a head-up display (HUD) for use in vehicle 100 as a mobile body, for example. Display system 10 is provided in a cabin of vehicle 100 to project an image onto windshield 101 (reflection member) of vehicle 100 from below. In an example shown in FIG. 2, display system 10 is disposed in dashboard 102 installed below windshield 101. When the image is projected from display system 10 onto windshield 101, the image reflected on windshield 101 as the reflection member is viewed by user 200 (driver). As shown in FIG. 10, vehicle 100 includes body 109, drive unit 104 that moves body 109, windshield 101 fixed to body 109, and display device 4 disposed in dashboard 102 of body 109. Drive unit 104 includes drive source 105 such as an engine or a motor, and drive wheels 106 driven by drive source 105.

According to display system 10, virtual image 300 looks like being projected onto target space 400 set in front of vehicle 100 (outside of the vehicle) for user 200. Here, "front" is a direction in which vehicle 100 moves forward, and a direction in which vehicle 100 moves forward or backward is referred to as a longitudinal direction. The "virtual image" means an image formed by a radiated ray as if an object were actually presented when light emitted from display system 10 is radiated by a reflecting object such as windshield 101. Since windshield 101 has optical transparency, user 200, as a target person, sees target space 400 in front of vehicle 100 through windshield 101. Therefore, user 200 sees virtual image 300, which is projected by display system 10, while superimposing virtual image 300 on a real space spreading in front of vehicle 100. Hence, according to display system 10, various pieces of driving assistance information such as vehicle speed information, navigation information, pedestrian information, front vehicle information, lane departure information and vehicle condition information can be displayed as virtual image 300 to be viewed by user 200. In this manner, user 200 can visually acquire the driving assistance information by only a slight movement of a line of sight from a state of directing the line of sight forward of windshield 101.

In display system 10 according to the exemplary embodiment, virtual image 300 formed in target space 400 includes at least two types of virtual images, i.e., first virtual image 301 and second virtual image 302. The "first virtual image" mentioned herein is virtual image 300 (301) formed on first virtual plane 501. The "first virtual plane" is a virtual plane in which inclination angle α with respect to optical axis 500 of display system 10 is smaller than predetermined value γ (α<γ). Moreover, the "second virtual image" mentioned herein is virtual image 300 (302) formed on second virtual plane 502. The "second virtual plane" is a virtual plane in which inclination angle β with respect to optical axis 500 of display system 10 is larger than predetermined value γ (β>γ). The "optical axis" mentioned herein is an optical axis of an optical system of projection optical system 4 (see FIG. 1) to be described later, that is, an axis that passes through a center of target space 400 and goes along an optical path of virtual image 300. An example of predetermined value γ is 45 degrees, and an example of inclination angle β is 90 degrees.

In display system 10 according to the exemplary embodiment, virtual image 300 formed in target space 400 includes third virtual image 303 (see FIG. 3) in addition to first virtual image 301 and second virtual image 302. The "third virtual image" is, similarly to second virtual image 302, virtual image 300 (303) formed on second virtual plane 502 in which inclination angle β with respect to optical axis 500 is larger than predetermined value γ. In virtual image 300 formed on second virtual plane 502, a virtual image formed by light penetrating movable screen 1a is second virtual image 302, and a virtual image formed by light penetrating fixed screen 1b is third virtual image 303, as details will be described later.

In the exemplary embodiment, optical axis 500 is along road surface 600 in front of vehicle 100 in target space 400 in front of vehicle 100. Then, first virtual image 301 is formed on first virtual plane 501 substantially parallel to road surface 600, and second virtual image 302 and third virtual image 303 are formed on second virtual plane 502 substantially perpendicular to road surface 600. For example, when road surface 600 is a horizontal plane, first virtual image 301 is displayed along the horizontal plane, and second virtual image 302 and third virtual image 303 are displayed along a vertical plane.

Figure 3:
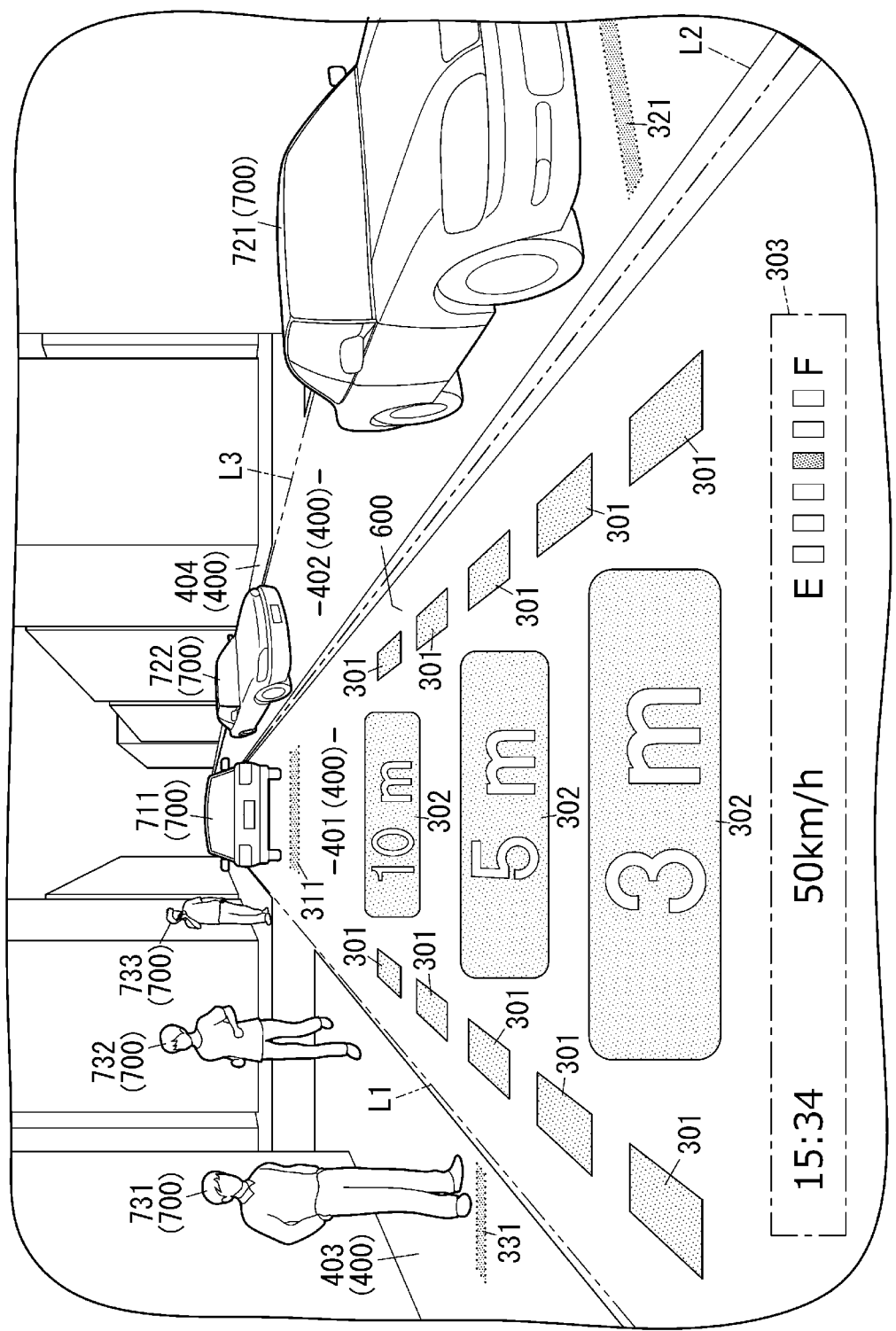
FIG. 3 is a conceptual diagram illustrating an example of display on the information presentation system.

FIG. 3 is a conceptual diagram illustrating a visual field of user 200. As shown in FIG. 3, display system 10 according to the exemplary embodiment is capable of displaying first virtual image 301 viewed with depth along road surface 600 and second virtual image 302 and third virtual image 303 viewed upright on road surface 600 at a fixed distance from user 200. Hence, for user 200, first virtual image 301 looks like being presented on a plane substantially parallel to road surface 600, and second virtual image 302 and third virtual image 303 look like being presented on a plane substantially perpendicular to road surface 600. An example of first virtual image 301 is navigation information indicating a traveling direction of vehicle 100, which can present an arrow that indicates a right turn or a left turn on road surface 600. An example of second virtual image 302 is information indicating a distance to a front vehicle or a pedestrian, which can present a distance to the front vehicle (inter-vehicle distance) on the front vehicle. An example of third virtual image 303 is a current time, vehicle speed information, and vehicle condition information, which can present these pieces of information, for example, by letters, numbers, and symbols, or a meter such as a fuel gauge.

(2) Configuration

As shown in FIG. 1, display system 10 according to the exemplary embodiment includes a plurality of screens 1, drive unit 2, irradiator 3, projection optical system 4, controller 5, and acquisition unit 6. According to the exemplary embodiment, projection optical system 4 with irradiator 3 constitutes display unit 40 that projects (displays) virtual image 300 (see FIG. 2) onto target space 400 (see FIG. 2).

Further, information presentation system 20 according to the exemplary embodiment includes display system 10 and detection system 7.

A plurality of screens 1 include fixed screen 1b and movable screen 1a. Fixed screen 1b is fixed to a fixed position of a housing or the like of display system 10. Movable screen 1a is inclined at angle θ with respect to reference plane 503. Moreover, movable screen 1a is configured to be movable in movement direction X orthogonal to reference plane 503. The "reference plane" mentioned herein is not a real plane but a virtual flat plane that defines the movement direction of movable screen 1a. Movable screen 1a is configured to be movable rectilinearly in movement direction X (direction shown by an arrow X1-X2 in FIG. 1) while maintaining a posture inclined at angle θ with respect to reference plane 503. In a case that movable screen 1a and fixed screen 1b are not particularly distinguished from one another, each of the plurality of screens 1 may be referred to as "screen 1" hereinafter.

Screen 1 (each of movable screen 1a and fixed screen 1b) has translucency and forms an image to form virtual image 300 (see FIG. 2) in target space 400 (see FIG. 2). That is, on screen 1, an image is drawn by light from irradiator 3, virtual image 300 is formed in target space 400 by the light penetrating screen 1. Screen 1 is composed of, for example, a plate-shaped member that has light diffusibility and is formed into a rectangular shape. Screen 1 is disposed between irradiator 3 and projection optical system 4.

Drive unit 2 moves movable screen 1a in movement direction X. Here, drive unit 2 moves movable screen 1a both in a direction toward and away from projection optical system 4 along movement direction X. For example, drive unit 2 is composed of an electric drive actuator such as a voice coil motor, and operates according to a first control signal output from controller 5.

Irradiator 3 is a scanning photoirradiation unit, and irradiates movable screen 1a or fixed screen 1b with light. Irradiator 3 includes light source 31 and scanner 32. In irradiator 3, each of light source 31 and scanner 32 operates according to a second control signal output from controller 5.

Light source 31 is formed of a laser module that outputs laser light. Light source 31 includes a red laser diode that emits a laser light beam of a red color (R), a green laser diode that emits a laser light beam of a green color (G), and a blue laser diode that emits a laser light beam of a blue color (B). Three color laser light beams output from these three kinds of laser diodes are synthesized by, for example, a dichroic mirror, and incident on scanner 32.

Scanner 32 irradiates movable screen 1a or fixed screen 1b with light that scans on one side of movable screen 1a or fixed screen 1b by scanning the light from light source 31. Here, scanner 32 executes raster scan in which the light is scanned two-dimensionally on one side of movable screen 1a or fixed screen 1b.

The light, as incident light, that is output from irradiator 3 and that penetrates screen 1 is incident on projection optical system 4. Projection optical system 4 projects virtual image 300 (see FIG. 2) onto target space 400 (see FIG. 2) with the incident light. Projection optical system 4 is arranged in line in movement direction X of movable screen 1a with respect to screen 1. As shown in FIG. 1, projection optical system 4 includes magnifying lens 41, first mirror 42, and second mirror 43.

Magnifying lens 41, first mirror 42, and second mirror 43 are arranged in this order on a route of the light penetrating screen 1. Magnifying lens 41 is disposed on an opposite side to irradiator 3 (first direction X1 side) in movement direction X as seen from screen 1 so that the light output from screen 1 in movement direction X is incident on magnifying lens 41. Magnifying lens 41 magnifies an image formed on screen 1 by the light emitted from irradiator 3 to output the image to first mirror 42. First mirror 42 reflects the light from magnifying lens 41 toward second mirror 43. Second mirror 43 reflects the light, which is emitted from first mirror 42, toward windshield 101 (see FIG. 2). That is, projection optical system 4 magnifies the image formed on screen 1 by the light emitted from irradiator 3 with magnifying lens 41 and projects the image onto windshield 101, thereby projecting virtual image 300 onto target space 400. An optical axis of magnifying lens 41 corresponds to optical axis 500 of projection optical system 4.

Acquisition unit 6 acquires the detection information of detection object 700 that exists in target space 400 from detection system 7. Acquisition unit 6 acquires information concerning a position of vehicle 100 (also referred to as "position information") and information concerning a state of vehicle 100 (also referred to as "vehicle information") from detection system 7. Detection object 700 mentioned herein is an object to which user 200 needs to pay attention, such as an object with which vehicle 100 is possible to collide, in objects that exist in target space 400. In the exemplary embodiment, a description will be given of a case that detection object 700 is a movable object, such as a person, an animal, a bicycle, a vehicle, a motorcycle, a wheelchair, or a stroller that exists in target space 400.

Detection system 7 includes, for example, camera 71 and light detection and ranging (LiDAR) 72.

Camera 71 includes an image pickup device such as a charge-coupled device (CCD) image sensor or a complementary metal oxide semiconductor (CMOS) image sensor to photograph target space 400.

LiDAR 72 irradiates target space 400 with a pulsed laser light beam, and receives reflected light reflected by an object in target space 400. LiDAR 72 detects a distance to the object based on time from emission of the laser light beam to reception of the reflected light.

Detection system 7 recognizes detection object 700 that exists in target space 400 from an image of camera 71 using, for example, a learning model formed by a machine learning algorithm Detection system 7 acquires information, such as a distance from vehicle 100 to detection object 700, a relative coordinate of detection object 700 to vehicle 100, a relative velocity between detection object 700 and vehicle 100, and an attribute of detection object 700, as detection information, based on detection result of LiDAR 72. Information of the "attribute" of detection object 700 mentioned herein is information indicating a kind of detection object 700. Detection system 7 distinguishes the kind of detection object 700 into either, for example, the movable object, such as a person, an animal, a bicycle, a vehicle, a motorcycle, a wheelchair, and a stroller, a fixed object, such as a traffic signal, a street light, and a utility pole, or a mobile object, such as a fallen object.

Detection system 7 obtains a current position of vehicle 100 using, for example, a global positioning system (GPS) to detect the position information concerning the position of vehicle 100 based on the current position of vehicle 100. Detection system 7 acquires map information of a neighborhood of the current position based on the current position of vehicle 100. Detection system 7 may acquire the map information of the neighborhood of the current position from a memory storing map information, or acquire the map information from an external server by communicating of mobile communicator included in detection system 7 or vehicle 100 with the external server. The position information mentioned herein is, for example, information of a road (traffic route) on which vehicle 100 currently travels. The position information is, for example, information such as the number of lanes on the road, width of a roadway, presence or absence of a sidewalk, a gradient, a curvature of a curve, presence or absence of a sidewalk, information as to whether a current position is an intersection (intersection such as a crossroad or a T-junction) or not, or information as to whether the road is one way or not.

Detection system 7 may acquire the vehicle information concerning a state of vehicle 100 from an advanced driver assistance system (ADAS) or the like. The vehicle information is information indicating the local state of the vehicle 100 itself, and the information detectable by a sensor installed on vehicle 100. As a specific example, the vehicle information is travelling speed (running speed) of vehicle 100, acceleration applied to vehicle 100, depression amount of an accelerator pedal (degree of accelerator opening), depression amount of a brake pedal, a steering angle, or a driver's pulse, an expression and a line of sight detected by a driver monitor. Specific data of vehicle 100, such as vehicle width, vehicle height, overall vehicle length, and eye point, is also included in the vehicle information.

According to the exemplary embodiment, detection system 7 includes camera 71 and LiDAR 72. However, a sensor for detecting detection object 700 is not limited to camera 71 and LiDAR 72. Detection system 7 may include one or more of camera 71, LiDAR 72, a sonar sensor, a radar and the like, as a sensor for detecting detection object 700. Note that, the sensor included in detection system 7 may be shared with the advanced driver assistance system.

Controller 5 is composed of a microcomputer mainly including, for example, a central processing unit (CPU) and a memory. In other words, controller 5 is realized by a computer including the CPU and the memory. The CPU executes a program stored in the memory, allowing the computer to function as controller 5. Herein, the program is recorded in the memory of controller 5 in advance. However, the program may be provided via a telecommunication line such as the Internet or by being recorded in a recording medium such as a memory card.

Controller 5 controls display of display unit 40 by controlling drive unit 2 and irradiator 3. Controller 5 controls drive unit 2 with the first control signal and controls irradiator 3 with the second control signal. Controller 5 is configured to synchronize operation of drive unit 2 with operation of irradiator 3. Controller 5 further functions as drive controller 51 and display controller 52 as shown in FIG. 1.

Drive controller 51 relatively moves movable screen 1a with respect to a reference position by controlling drive unit 2. The "reference position" mentioned herein is a position provided at a prescribed position in a movement area of movable screen 1a. Drive controller 51 moves movable screen 1a in order to project second virtual image 302 onto target space 400 by the light penetrating movable screen 1a. Drive controller 51 controls drive unit 2 by synchronizing with drawing on movable screen 1a by irradiator 3.

Display controller 52 determines substance (content) of virtual image 300 projected onto target space 400 by display unit 40 based on the detection information, position information and vehicle information acquired by acquisition unit 6.

Figure 4:
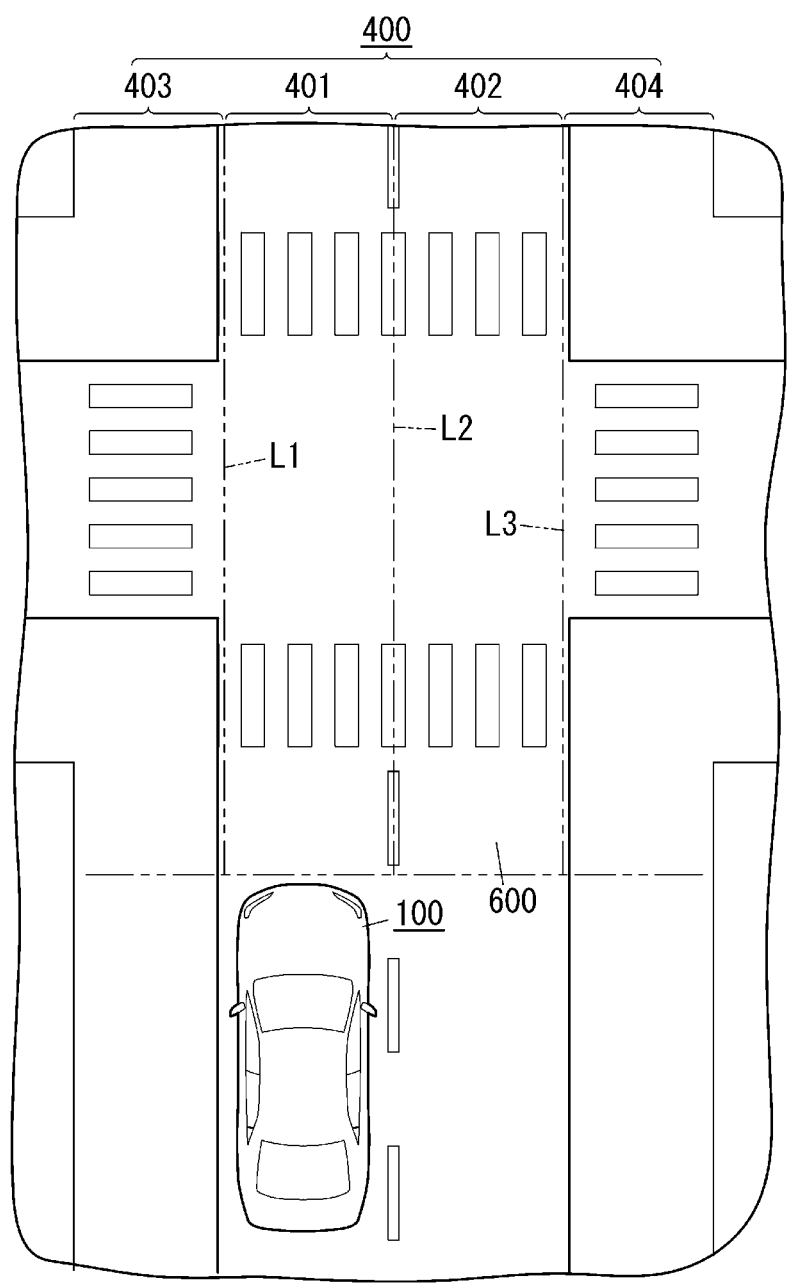
FIG. 4 is a schematic plan view of a neighborhood of an intersection in FIG. 3.

In target space 400, at least one detection area is provided in a lateral direction that intersects with each of a longitudinal direction and a vertical direction. According to the exemplary embodiment, as shown in FIGS. 3 and 4, four detection areas 401, 402, 403, 404 are provided in target space 400 in the lateral direction. FIG. 4 is a schematic plan view of a neighborhood of an intersection in FIG. 3. In FIG. 4, detection object 700 is omitted. In FIGS. 3 and 4, each of boundary lines L1, L2, L3 dividing detection areas 401, 402, 403, 404 is indicated by a two-dot chain line. Each of boundary lines L1, L2, L3 is an imaginary line that is not displayed by display unit 40. Detection area 401 corresponds to a lane on which the host vehicle (vehicle 100) travels and its upper space. Detection area 402 corresponds to the opposite lane on which an oncoming vehicle travels and its upper space. Detection area 403 is an area including a sidewalk that exists on one side (opposite side to the opposite lane) of detection area 401 and its upper space. Detection area 404 is an area including a sidewalk that exists on a side of the opposite lane and its upper space. When a part of target space 400 that is seen in front of vehicle 100 is an impassable area (for example, a cliff) through which a person or a vehicle cannot pass, detection area may be provided on an area excluding the impassable area in target space 400.

Controller 5 determines a display object in detection objects 700 that exist in each of detection areas 401 to 404 based on the detection information and causes display unit 40 to display (project onto target space 400) virtual image 300 corresponding to detection object 700 determined as the display object. According to the exemplary embodiment, controller 5 determines detection object 700 (also referred to as "first detection object") that exists closest to vehicle 100 (host vehicle) as the display object in each of detection areas 401 to 404. In the example shown in FIG. 3, detection object 711 (700) that is a vehicle traveling in the front exists in detection area 401. Detection objects 721, 722 (700) each of which is an oncoming vehicle exist in detection area 402. Detection objects 731 to 733 (700) each of which is a pedestrian exist in detection area 403. Meanwhile, no detection object exists in detection area 404. Controller 5 sets the first detection object as the display object in each of detection areas 401 to 404. Controller 5 sets detection object 711 as the display object in detection area 401, sets detection object 721 as the display object in detection area 402, and sets detection object 731 as the display object in detection area 403.

Controller 5 causes display unit 40 to display virtual images 311, 321, 331 respectively corresponding to detection objects 711, 721, 731 serving as the display objects. In the example shown in FIG. 3, each of virtual images 311, 321, 331 is a rod-shaped marker that is long in the lateral direction. Virtual images 311, 321, 331 are respectively displayed in front of detection objects 711, 721, 731 serving as the display objects. Controller 5 causes display unit 40 to display virtual images 311, 321, 331 respectively corresponding to detection objects 711, 721, 731 serving as the display objects, with a viewing distance according to a distance between vehicle 100 (host vehicle) and each of detection objects 711, 721, 731. Therefore, since virtual images 311, 321, 331 look like being projected near corresponding detection objects 711, 721, 731, user 200 easily understands detection objects 711, 721, 731 to which virtual images 311, 321, 331 respectively corresponds. Virtual images 311, 321, 331 respectively corresponding to detection objects 711, 721, 731 serving as the display objects are not limited to the rod-shaped markers. Each of virtual images 311, 321, 331 may be a frame-like virtual image surrounding the display object and may be appropriately changed. For example, controller 5 may change the content of each of virtual images 311, 321, 331 according to the attributes of detection objects 711, 721, 731 serving as the display objects, detection areas 401, 402, 403 in which detection objects 711, 721, 731 exist, or the like.

Controller 5 may set the detection object (also referred to as "second detection object") having the shortest time to collision (TTC) in detection objects 700 exist in respective detection areas 401 to 404, as the display object. The time to collision is time until the host vehicle collides with the detection object when the present relative velocity between the host vehicle and the detection object is maintained. The time to collision is obtained by dividing a relative distance between the host vehicle and the detection object by the relative velocity between the host vehicle and the detection object. Controller 5 may set both the first detection object and the second detection object in detection objects 700 exist in respective detection areas 401 to 404, as the display objects.

Controller 5 may use an indicator for evaluating a degree of danger of detection object 700 to vehicle 100 (host vehicle) instead of the time to collision, and determine the display object based on the indicator. For example, controller 5 may determine detection object 700 having the highest degree of danger as the display object based on the relative coordinate between detection object 700 and vehicle 100 (host vehicle), movement directions of detection object 700 and the host vehicle, and a predicted value of travelling speed.

(3) Operation

A basic operation of information presentation system 20 (display system 10) of the exemplary embodiment will be described hereinafter. Controller 5 controls irradiator 3 to irradiate movable screen 1a with light from irradiator 3. At this moment, irradiator 3 emits light scanning on one side of movable screen 1a. Therefore, an image is formed on (projected onto) movable screen 1a. The light from irradiator 3 penetrates movable screen 1a, and irradiates windshield 101 from projection optical system 4. In this manner, the image formed on movable screen 1a is projected onto windshield 101 from below windshield 101 in the cabin of vehicle 100.

When the image is projected from projection optical system 4 onto windshield 101, windshield 101 reflects the light from projection optical system 4 toward user 200 (driver) in the cabin. This allows user 200 to view the image reflected by windshield 101. User 200 views as if virtual image 300 (first virtual image 301 or second virtual image 302) was projected in front of vehicle 100 (outside of the vehicle). As a result, user 200 views virtual image 300 (first virtual image 301 or second virtual image 302), that is projected in front of vehicle 100 (outside of the vehicle), as if virtual image 300 was viewed through windshield 101.

Specifically, controller 5 scans the light on one side of movable screen 1a in a state that movable screen 1a is fixed in movement direction X, so that first virtual image 301 viewed with depth along road surface 600 is formed. Controller 5 scans the light on one side of movable screen 1a, while moving movable screen 1a so that a distance in direction X between a luminescent spot on one side of movable screen 1a and projection optical system 4 is kept constant. Consequently, second virtual image 302, which is viewed to stand upright on road surface 600 that is positioned at a fixed distance from user 200, is formed.

While irradiator 3 irradiates movable screen 1a with light, drive controller 51 controls drive unit 2 to move movable screen 1a in movement direction X. In a case that an irradiation position on one side of movable screen 1a on which the light is emitted from irradiator 3, that is, a position of the luminescent spot is constant, when movable screen 1a moves in first direction X1, a distance from eye (eye point) of user 200 to virtual image 300 (also referred to as "viewing distance") becomes shorter. To the contrary, in a case that the position of the luminescent spot on one side of movable screen 1a is constant, when movable screen 1a moves in second direction X2 opposite to first direction X1, the viewing distance to virtual image 300 becomes longer (more distant). That is, the viewing distance to virtual image 300 changes according to a position of movable screen 1a in the movement direction.

For example, in a case that the viewing distance of first virtual image 301 is changed, controller 5 moves movable screen 1a in direction X according to the viewing distance. In a state that movable screen 1a is fixed at a position after movement, the light is scanned on one side of movable screen 1a. In a case that the viewing distance of second virtual image 302 is changed, controller 5 moves movable screen 1a in direction X according to the viewing distance. Controller 5 scans the light on one side of movable screen 1a, while moving movable screen 1a so that the distance in direction X between the luminescent spot and projection optical system 4 is kept constant based on the position after movement.

Controller 5 controls irradiator 3 to irradiate fixed screen 1b with light from irradiator 3. At this moment, irradiator 3 emits light scanning on one side of fixed screen 1b. Therefore, similarly to a case that movable screen 1a is irradiated with light, an image is formed on (projected onto) fixed screen 1b and the image is projected onto windshield 101. As a result, user 200 views virtual image 300 (third virtual image 303), which is projected in front of vehicle 100 (outside of the vehicle), through windshield 101. Since third virtual image 303 is formed by the light projected onto fixed screen 1b whose position is fixed, third virtual image 303 is viewed to stand upright at a predetermined distance (for example, 2 to 3 meters) from user 200 on road surface 600.

Display system 10 of the exemplary embodiment projects all of first virtual image 301, second virtual image 302, and third virtual image 303 during one cycle in which scanner 32 makes one round trip in a longitudinal direction of movable screen 1a (in an inclined direction with respect to reference plane 503 of movable screen 1a). Specifically, on "outward way" in which the light is scanned on movable screen 1a and fixed screen 1b in this order, at first, display unit 40 irradiates movable screen 1a with light to project first virtual image 301, and then irradiates fixed screen 1b with light to display third virtual image 303. On "return way" in which the light is scanned on fixed screen 1b and movable screen 1a in this order, at first, display unit 40 irradiates fixed screen 1b with light to display third virtual image 303, and then irradiates movable screen 1a with light to project second virtual image 302.

Therefore, first virtual image 301, third virtual image 303, and second virtual image 302 are projected onto target space 400 during one cycle in which scanner 32 scans in the longitudinal direction. Scanning in the longitudinal direction is performed in irradiator 3 relatively fast, so that user 200 views as if first virtual image 301, third virtual image 303, and second virtual image 302 were displayed simultaneously. Frequency of scanning in the longitudinal direction in irradiator 3 is, for example, not less than 60 Hz.

Figure 5:
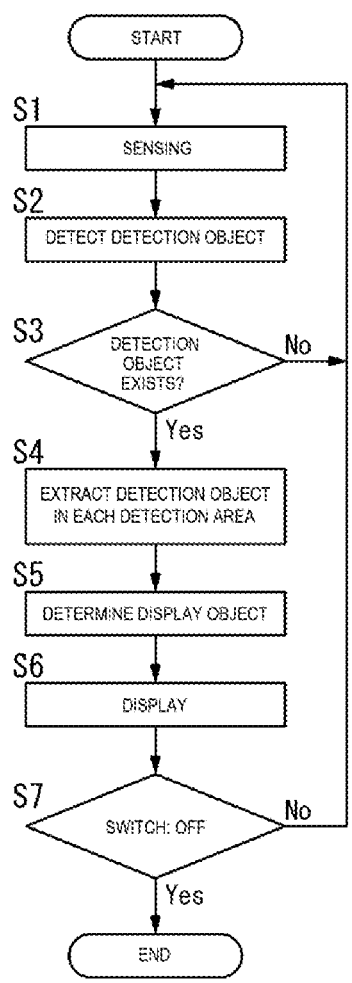
FIG. 5 is a flowchart for describing an operation of the information presentation system.

With reference to FIG. 5, display operation of information presentation system 20 of the exemplary embodiment, which is executed for informing user 200 of existence of the detection object based on the detection information detected by detection system 7, will be described hereinafter.

When user 200, as a driver of vehicle 100, turns on an ignition switch, electricity is supplied to information presentation system 20 (display system 10 and detection system 7), so that information presentation system 20 starts to be operated. Detection system 7 senses target space 400 with camera 71 and LiDAR 72 (S1), and processes to detect detection object 700 in target space 400 (S2) based on an image formed by camera 71 and a measurement result measured by LiDAR 72.

In a case that no detection object 700 exists in target space 400 (S3: No), detection system 7 moves to step S1 after a fixed time passes, and processes to sense target space 400 again.

In a case that detection object 700 exists in target space 400 (S3: Yes), controller 5 processes to extract the detection object in each of detection areas 401 to 404 (S4). Controller 5 sets the plurality of detection areas 401 to 404 in target space 400 based on the position information (information such as the number of lanes on the road, width of the roadway, presence or absence of the sidewalk) acquired by acquisition unit 6. Specifically, controller 5 divides target space 400 into four detection areas 401 to 404 in the lateral direction according to a kind (for example, a travel lane, an opposite lane, and a sidewalk) of the road (traffic route) included in target space 400. Note that, detection system 7 may set the plurality of detection areas 401 to 404 in target space 400, and output a result in which detection object 700 is detected in each of detection areas 401 to 404 as the detection information to display system 10.

After extracting detection object 700 in each of detection areas 401 to 404, display controller 52 of controller 5 sets the first detection object that exists closest to vehicle 100 (host vehicle) in each of detection areas 401 to 404 as the display object (S5). Display controller 52 determines the substance (content) of virtual image 300 corresponding to the first detection object serving as the display object in each of detection areas 401 to 404. Then, drive controller 51 of controller 5 controls drive unit 2 and irradiator 3 to display virtual image 300 in front of the first detection object serving as the display object in each of detection areas 401 to 404 (S6). In the example shown in FIG. 3, detection objects (first detection objects) 711, 721, 731 respectively serve as the display objects in detection areas 401, 402, 403, and virtual images 311, 321, 331 are respectively displayed in front of detection objects 711, 721, 731. Each of virtual images 311, 321, 331 is a rod-shaped marker that is long in the lateral direction. Since virtual images 311, 321, 331 are respectively projected in front of detection objects (first detection objects) 711, 721, 731, user 200 pays attention to detection objects 711, 721, 731 respectively closest to the host vehicle in each of detection areas 401, 402, 403. That is, although a plurality of detection objects 700 exist in each of detection areas 401 to 404, a virtual image except the first detection object corresponding to detection object 700 is not displayed. Therefore, user 200 pays attention to the first detection object that needs special attention. Virtual images 311, 321, 331 each corresponding to the detection object serving as the display object is first virtual image 301 viewed with depth along road surface 600. Each of virtual images 311, 321, 331 may be second virtual image 302 viewed to stand upright at a fixed distance from user 200 on road surface 600.

After display unit 40 displays virtual images 311, 321, 331 each corresponding to the display object, controller 5 determines whether or not the ignition switch has been turned off (S7). When the ignition switch is turned off (S7: Yes), controller 5 finishes the process. When the ignition switch is turned on (S7: No), detection system 7 moves to step S1 after a fixed time passes, and processes to sense target space 400 again.

Figure 6:
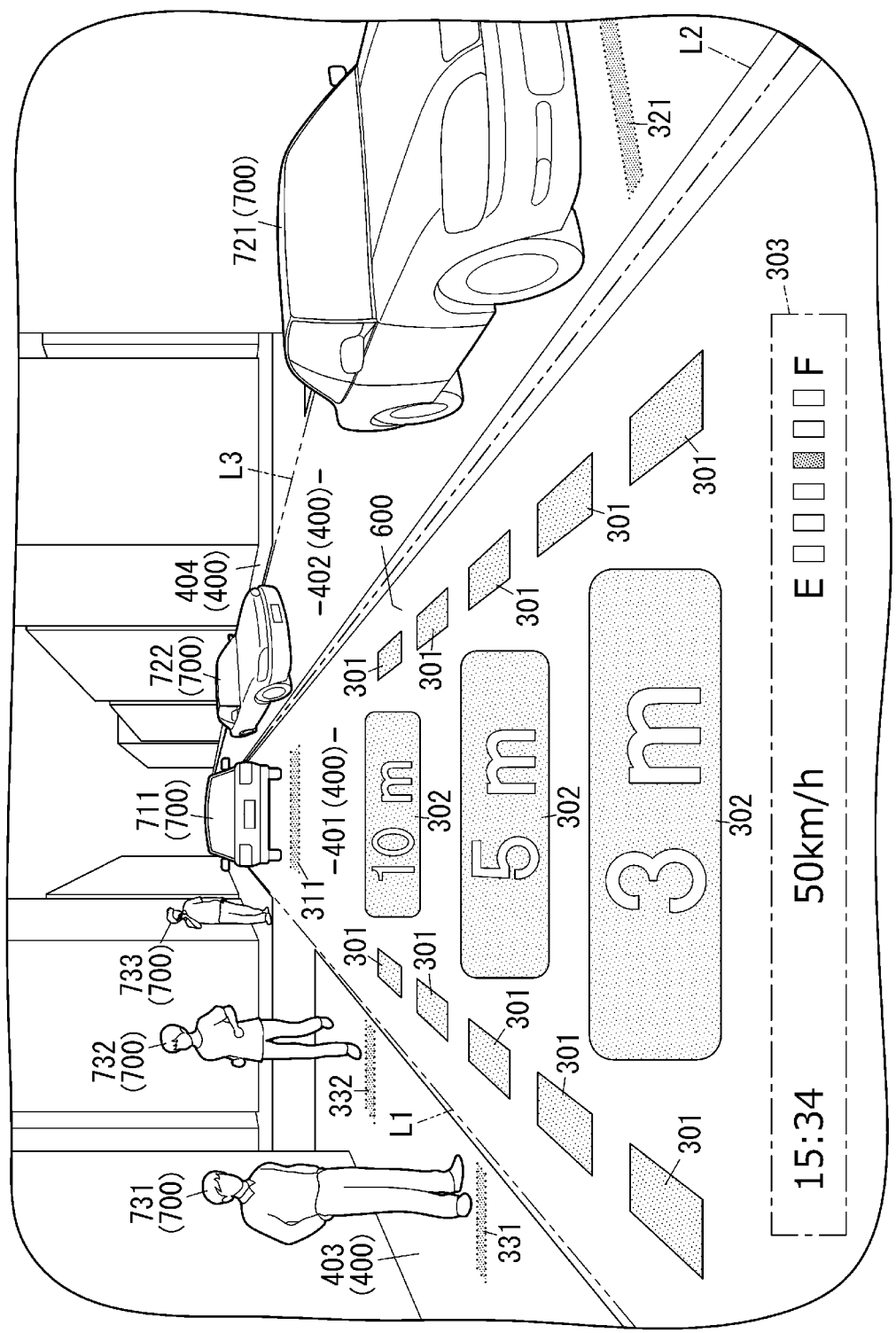
FIG. 6 is a conceptual diagram illustrating another example of display on the information presentation system.

In step S5, display controller 52 of controller 5 may set, as the display objects, both the first detection object that exists closest to vehicle 100 (host vehicle) and the second detection object having the shortest time to collision in each of detection areas 401 to 404. In the example shown in FIG. 6, in detection area 403 including the sidewalk, detection object 732 that exists more distant from the host vehicle than detection object (first detection object) 731 closest to the host vehicle. However, the time to collision of detection object 732 is the shortest. In this case, display controller 52 sets, as the display objects, both detection object 731 serving as the first detection object and detection object 732 serving as the second detection object. Display controller 52 determines the substance (content) of each of virtual images 331, 332 respectively corresponding to detection objects 731, 732. Drive controller 51 controls drive unit 2 and irradiator 3 to display virtual images 331, 332 respectively in front of detection objects 731, 732. Therefore, user 200 can pay attention to both the first detection object closest to the host vehicle and the second detection object having the shortest time to collision in each of detection areas 401 to 404. In step S5, display controller 52 of controller 5 may set only the second detection object having the shortest time to collision in each of detection areas 401 to 404, as the display object. Drive controller 51 controls drive unit 2 and irradiator 3 to display virtual image 300 in front of the second detection object, so that user 200 pays attention to the second detection object.

(4) Modifications

The exemplary embodiment mentioned above is merely one of various exemplary embodiments of the present disclosure. The exemplary embodiment mentioned above can be variously modified in accordance with a design, for example, as long as the object of the present disclosure can be achieved. The same function as display system 10 may be embodied by, for example, a method for controlling display system 10, a program, or a non-transitory computer-readable recording medium storing a program. A method for controlling display system 10 of an aspect is a method for controlling display system 10 that includes acquisition unit 6 that acquires detection information of detection object 700 that exists in target space 400, display unit 40 that displays virtual image 300 in target space 400, and controller 5 that controls the display of the display unit 40. In target space 400, at least one detection area 401 to 404 is provided in the lateral direction that intersects with each of the longitudinal direction and the vertical direction. The method for controlling display system 10 sets at least one of the first detection object that exists closest to and the second detection object having the shortest time to collision in detection objects 700 that exist in each of the detection areas 401 to 404 as the display object, based on the detection information. In the method for controlling display system 10, controller 5 causes display unit 40 to display virtual image 300 corresponding to the display object on. A (computer) program of an aspect is a program for making a computer system execute a method for controlling display system 10.

Modifications of the above exemplary embodiment will be described below. Modifications described below can be applied in appropriate combination.

An executing subject of display system 10, information presentation system 20, or the method for controlling display system 10 of the disclosure includes a computer system. The computer system is mainly composed of a processor, as hardware, and a memory. The processor executes the program stored in the memory of the computer system, so that function, as the executing subject of display system 10, information presentation system 20, or the method for controlling display system 10 of the disclosure, is realized. The program may be stored in the memory of the computer system in advance, may be supplied to through a telecommunication line, or may be supplied to in a state that the program is stored in the non-transitory computer-readable recording medium. This type of the non-transitory computer-readable recording medium includes, for example, a memory card, an optical disk, and a hard disk drive. The processor of the computer system is composed of one or a plurality of electronic circuits including Integrated Circuit (IC) or Large-Scale Integration (LSI). The plurality of electronic circuits may be integrated in one chip, or may be provided on a plurality of chips so as to be dispersed. The plurality of chips may be integrated in one device, or may be provided on a plurality of devices so as to be dispersed.

Functions of acquisition unit 6, display unit 40, and controller 5 of display system 10 may be provided on a plurality of systems so as to be dispersed. A function of controller 5 of display system 10 may be realized by, for example, cloud (cloud computing).

Information presentation system 20 is realized with display system 10 and detection system 7. However, information presentation system 20 is not limited to this structure. Information presentation system 20 may be realized with, for example, one of display system 10 and detection system 7. For example, a function of detection system 7 may be integrated in display system 10.

(4.1) Modification 1

According to the exemplary embodiment mentioned above, in target space 400, four detection areas 401 to 404 are provided in the lateral direction.

In target space 400, at least one detection area may be provided in the lateral direction. The number of the detection areas may be one or plural, and it may be changed appropriately. Structures of display system 10 and information presentation system 20 are the same as the above exemplary embodiment to omit description thereof.

Figure 7:
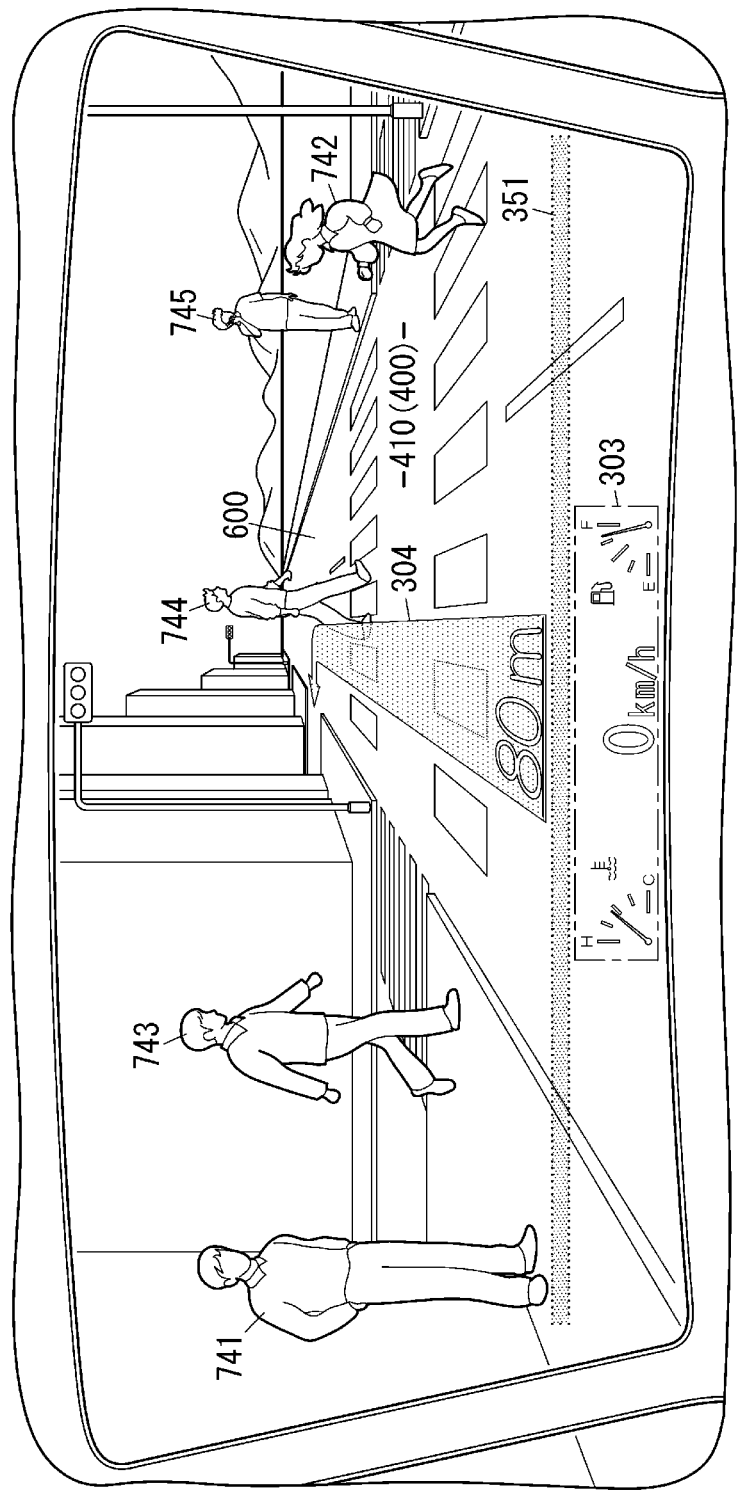
FIG. 7 is a conceptual diagram illustrating an example of display on an information presentation system of a first modification of the exemplary embodiment of the present disclosure.

In example shown in FIG. 7, the whole of target space 400 is provided in one detection are 410. In this case, controller 5 sets detection object 741 that exists closest to vehicle 100 (host vehicle) in a plurality of detection objects 741 to 745 that exist in detection area 410 as the display object. Controller 5 controls display unit 40 to display virtual image 351 in front of detection object 741 that is the display object. In example shown in FIG. 7, display unit 40 displays also first virtual image 304 for displaying a traveling route of vehicle 100 and third virtual image 303 for displaying the vehicle information in target space 400.

Virtual image 351 is a rod-shaped marker that is long in the lateral direction to be displayed from one end side to the other end side of detection area 410 in the lateral direction. Since virtual image 351 is displayed from one end side to the other end side of detection area 410 in the lateral direction, user 200 becomes easy to notice virtual image 351 and easy to notice existence of detection object (first detection object) 741 that is the display object.

Figure 8:
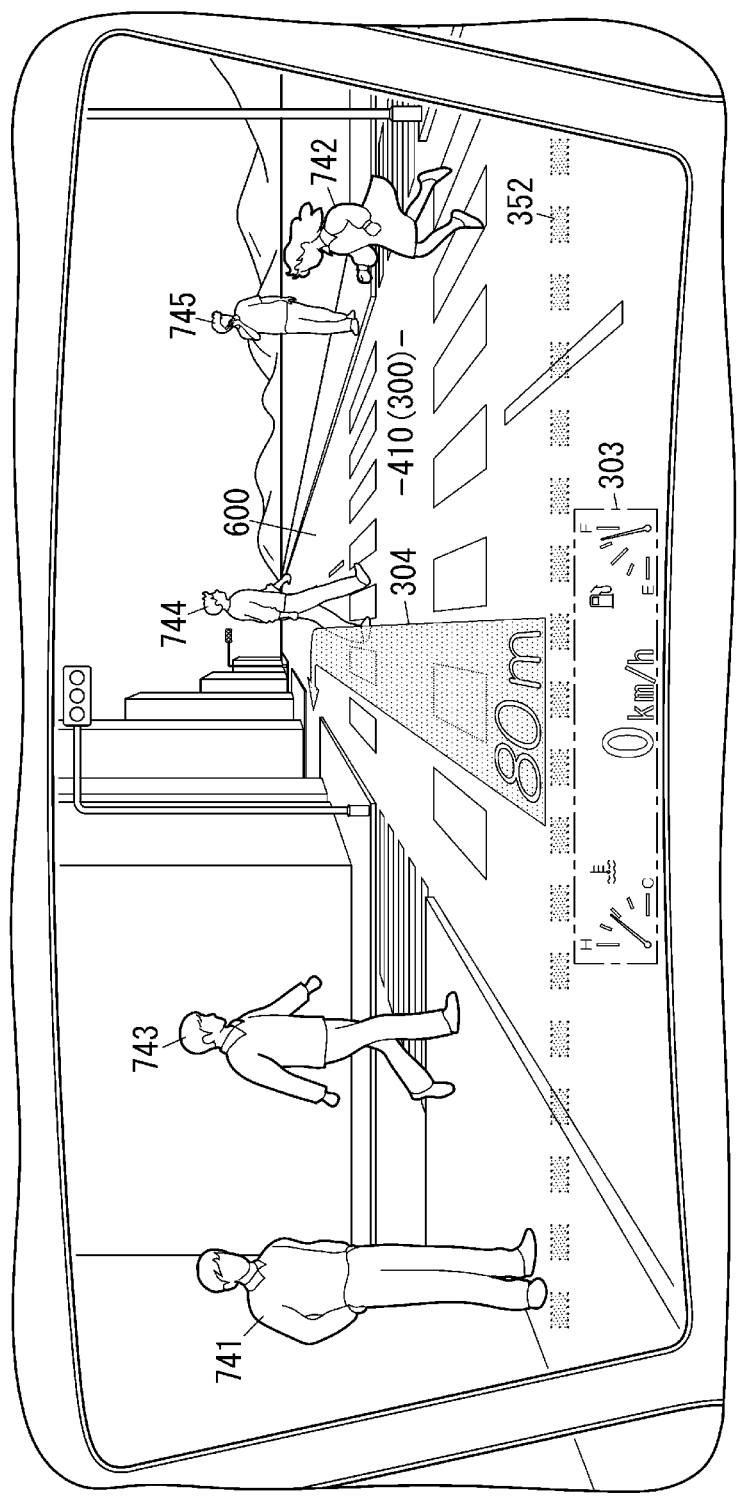
FIG. 8 is a conceptual diagram illustrating another example of display on the information presentation system of the first modification.

In example shown in FIG. 7, virtual image 351 is the rod-shaped marker that is long in the lateral direction, and virtual image 351 may be changed appropriately. For example, as shown in FIG. 8, controller 5 may control display unit 40 to display virtual image 352 that resembles a carriageway marking (zebra pattern) indicating a crosswalk. Since virtual image 352 is a pattern to remind a person crossing the road, user 200 having viewed virtual image 352 becomes easy to notice existence of the person that is first detection object 741.

(4.2) Modification 2

According to the exemplary embodiment mentioned above, display forms of the virtual images each corresponding to the display object are same each other in each of detection areas 401 to 404. However, display controller 52 may change the display form of the virtual image corresponding to the display object in each of detection areas 401 to 404 to be different from the display forms of the virtual images of other detection areas. Structures of display system 10 and information presentation system 20 are the same as the above exemplary embodiment to omit description thereof.

According to modification 2, display controller 52 changes at least one of color, brightness, size, and pattern of virtual image 300 corresponding to the display object in each of detection areas 401 to 404 to be different from the display forms of the virtual images of other detection areas. Display controller 52 may change the display form of virtual image 300, for example, so that virtual image 300, displayed in detection area 401 including a lane on which vehicle 100 (host vehicle) travels, is conspicuous relative to virtual image 300 displayed in other detection areas 402 to 404. Therefore, user 200 becomes easy to pay attention to the display object that needs more attention. Further, there is an advantage to speculate detection area 401 to 404 in which the display object exists based on the display form of virtual image 300.

(4.3) Modification 3

According to display system 10 of modification 3, controller 5 sets at least one of the first detection object that exists closest to and the second detection object having the shortest time to collision in detection objects 700 having the same attributes each other in the detection area as the display object in each of the detection areas 401 to 404. Structures of display system 10 and information presentation system 20 are the same as the above exemplary embodiment to omit description thereof.

Acquisition unit 6 of display system 10 acquires the detection information from the detection system 7. In the detection information acquired by acquisition unit 6 from detection system 7, information of the attribute of detection object 700 is also included.

Controller 5 extracts detection object 700 in each of detection areas 401 to 404 based on the detection information acquired by acquisition unit 6. Controller 5 sets the first detection object that exists closest to in the detection objects having the same attributes each other, in each of the detection areas 401 to 404 as the display object, based on information of attribute of detection object 700.

Figure 9:
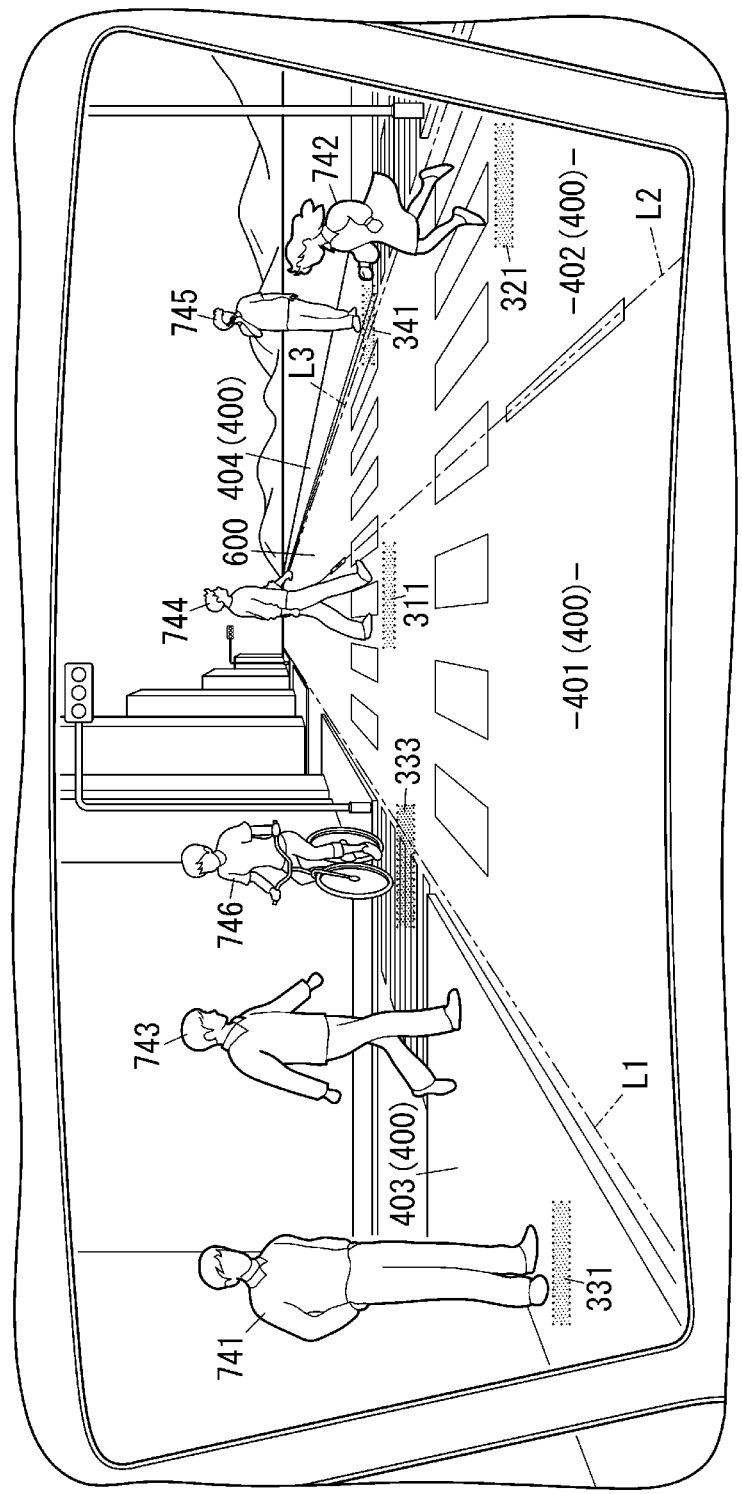
FIG. 9 is a conceptual diagram illustrating an example of display on an information presentation system of a third modification of the exemplary embodiment of the present disclosure.

For example, in example shown in FIG. 9, a plurality of detection objects 741, 743, 746 having a plurality of attributes exist in detection area 403. Each of the attributes of detection objects 741, 743 is a person, and the attribute of detection object 746 is a bicycle. Display controller 52 of controller 5 sets the first detection object that exists closest to in the detection objects having the same attributes each other as the display object, in each of the detection areas 401 to 404. Therefore, in detection area 403, display controller 52 sets detection object 741 that exists closest to as the display object, with respect to detection objects 741, 743 each having attribute of the person. Display controller 52 sets detection object 746 as the display object, with respect to detection object 746 having attribute of the bicycle. Then, display controller 52 forms virtual images 331, 333 respectively corresponding to detection objects 741, 746 that are the display objects and causes display unit 40 to display (project) virtual images 331, 333.

As described above, when detection objects 700 include a plurality of attributes, since the first detection object closest to is set as the display object, virtual image 300 corresponding to the first detection object is displayed by display unit 40 for each attribute. Therefore, user 200 recognizes detection object 700 that needs special attention for each attribute based on virtual images 331, 333 displayed in target space 400 by display unit 40.

Display controller 52 of controller 5 may change the display form of virtual images 331, 333 respectively corresponding to detection objects 741, 746 according to the attributes of detection objects 741, 746. Display controller 52 changes at least one of color, brightness, size, and pattern of virtual images 331, 333 according to the attributes of detection objects 741, 746. Therefore, there is an advantage to clarify difference between virtual images 331, 333 displayed by display unit 40 for each attribute. Further, there is an advantage to speculate the attributes of detection objects 741, 746 that are the display objects based on the display forms of virtual images 331, 333.

Since only detection objects 744, 742, 745 having the same attributes each other respectively exist in detection areas 401, 402, 404, display controller 52 of controller 5 sets detection objects 744, 742, 745 each closest to in detection areas 744, 742, 745 as the display objects.

Incidentally, controller 5 may set the second detection object having the shortest time to collision as the display object, and may set both the first detection object and the second detection object as the display objects, in detection objects 700 having the same attributes each other in each of detection areas 401 to 404.

(4.4) Other Modification

Acquisition unit 6 of display system 10 acquires the detection information from detection system 7 provided on vehicle 100. Acquisition unit 6 may be configured to acquire the detection information by communication between a communication unit included in display system 10 or vehicle 100 and an outside. For example, acquisition unit 6 may acquire the detection information by an inter vehicle communication (V2V: Vehicle-to-Vehicle) between vehicle 100 and a peripheral vehicle, an intervehicle and road-vehicle communication (V2X: Vehicle-to-Everything) between vehicle 100 and the peripheral vehicle or infrastructure, or the like. The content of virtual image 300 projected onto target space 400 may be determined by the infrastructure. In this case, at least a part of controller 5 may not be installed on vehicle 100.

Detection object 700 is the movable object that exists in target space 400. However, detection object 700 is not limited to the movable object. Detection object 700 may include the fixed object, such as the traffic signal, the street light, the guardrail, the road side tree that steadily exist in target space 400, the mobile object, such as the fallen object that temporally exists in target space 400, or the like.

Furthermore, display system 10 is not limited to the configuration of projecting virtual image 300 onto target space 400 set in front of vehicle 100 in the traveling direction. For example, display system 10 may project virtual image 300 in a side direction, a rear direction, or an upper direction and the like in the traveling direction of vehicle 100.

In addition, display system 10 is not limited to the head-up display for use in vehicle 100. For example, display system 10 is also applicable for a mobile body other than vehicle 100, the other mobile body including a motorcycle, a train, an aircraft, a construction machine, a vessel and the like for example. Moreover, the place of use of display system 10 is not limited to the mobile body. For example, display system 10 may be used in an amusement facility. Display system 10 may also be used as a wearable terminal such as Head Mounted Display (HMD). Furthermore, display system 10 may be used at a medical facility, and may be used as a stationary device.

Display unit 40 of display system 10 includes movable screen 1a and fixed screen 1b. Display unit 40 may include at least movable screen 1a.

Display unit 40 is not limited to the configuration of projecting the virtual image by a laser beam. For example, display unit 40 may also be configured to allow a projector to project an image (virtual image 300) onto a diffuse transmission type screen 1 from behind the screen 1. Display unit 40 may project virtual image 300 according to an image displayed by a liquid crystal display through projection optical system 4.

The reflection member that reflects the light emitted from display unit 40 is composed of windshield 101 of vehicle 100. The reflection member is not limited to windshield 101. The reflection member may be a transparent plate provided separately from windshield 101.

SUMMARY

As described above, display system (10) of a first aspect is the display system for use in the mobile body that includes acquisition unit (6), display unit (40), and controller (5). Acquisition unit (6) acquires the detection information of at least one detection object (700, 711, 721, 731 to 733, 741 to 746) exists in target space (400). Display unit (40) displays virtual images (311, 321, 331 to 333, 341, 351, 352) in target space (400). Controller 5 controls the display of display unit (40). In the target space (400), at least one detection area (401 to 404) is provided in the lateral direction that intersects with each of the longitudinal direction and the vertical direction. At least one detection object (700, 711, 721, 731 to 733, 741 to 746) includes first detection object (711, 721, 731, 741, 742, 744 to 746) that exists closest to the mobile body and second detection object (732) that has a shortest time to collision with the mobile body. Controller (5) sets at least one of first detection object (711, 721, 731, 741, 742, 744 to 746) and second detection object (732) as the display object, based on the detection information, to cause display unit (40) to display virtual image (311, 321, 331 to 333, 341, 351, 352) corresponding to the display object.

According to the first aspect, controller (5) sets at least one of the first detection object and the second detection object as the display object, to cause display unit (40) to display virtual image (311, 321, 331 to 333, 341, 351, 352) corresponding to the display object. Therefore, virtual image (311, 321, 331 to 333, 341, 351, 352) corresponding to the display object becomes well visible relative to a case that virtual images corresponding to all the detection objects are displayed in target space (400), so that user 200 easily understand the display.

In display system (10) of a second aspect, according to the first aspect, at least one detection area includes the plurality of detection areas (401 to 404) in the lateral direction in target space (400). Controller (5) causes display unit (40) to display virtual image (311, 321, 331 to 333, 341, 351, 352) corresponding to the display object in each of the plurality of detection areas (401 to 404).

According to the second aspect, user (200) pays attention to the display object in each of the plurality of detection areas (401 to 404).

In display system (10) of a third aspect, according to the second aspect, controller (5) changes virtual image (311, 321, 331 to 333, 341, 351, 352) in each of the plurality of detection areas (401 to 404) to be different from the virtual images of other detection areas.

According to the third aspect, there is an advantage to speculate detection area (401 to 404) in which the display object exists based on the content of virtual image (311, 321, 331 to 333, 341, 351, 352).

In display system (10) of a fourth aspect, according to the second or third aspect, target space (400) includes the traffic route along which mobile body (100) goes so that the plurality of detection areas (401 to 404) are divided according to the kind of the traffic route.

According to the fourth aspect, the display object is determined in each of detection areas (401 to 404) divided according to the kind of the traffic route.

In display system (10) of a fifth aspect, according to any one of the first to fourth aspects, detection object (700, 711, 721, 731 to 733, 741 to 746) includes the plurality of attributes. Controller (5) sets at least one of the first detection object closest to and the second detection object having the shortest time to collision in detection objects (700, 711, 721, 731 to 733, 741 to 746) having the same attributes that exist in detection area (401 to 404) as the display object.

According to the fifth aspect, display object is determined for each attribute of detection object (700, 711, 721, 731 to 733, 741 to 746) so that user (200) pays attention to the display object that is determined for each attribute.

In display system (10) of a sixth aspect, according to the fifth aspect, controller (5) changes virtual image (311, 321, 331 to 333, 341, 351, 352) according to the attribute of display object (700, 711, 721, 731 to 733, 741 to 746).

According to the sixth aspect, there is an advantage to speculate the attribute of detection object (700) that is the display object based on the content of virtual image (311, 321, 331 to 333, 341, 351, 352).

In display system (10) of a seventh aspect, according to any one of the first to sixth aspects, virtual image (311, 321, 331 to 333, 341, 351, 352) is the rod-shaped marker that is long in the lateral direction that is displayed in front of the display object.

According to the seventh aspect, there is an advantage that a position of detection object (700, 711, 721, 731 to 733, 741 to 746) that is the display object is easy to recognize.

In display system (10) of an eighth aspect, according to any one of the first to seventh aspects, controller (5) causes display unit (40) to display virtual image (311, 321, 331 to 333, 341, 351, 352) with the viewing distance in accordance with the distance to the display object.

According to the eighth aspect, there is an advantage that a position of detection object (700, 711, 721, 731 to 733, 741 to 746) that is the display object is easy to recognize.

Information presentation system (20) of a ninth aspect includes display system (10) according to any one of the first to eighth aspects and detection system (7) that detects detection object (700, 711, 721, 731 to 733, 741 to 746) in target space (400). Acquisition unit (6) acquires the detection information from detection system (7).

According to the ninth aspect, it is possible to provide information presentation system (20) that makes the display easy for user (200) to understand.

The method for controlling display system (10) of tenth aspect is a control method for controlling display system (10) for use in the mobile body that includes acquisition unit (6), display unit (40), and controller (5). Acquisition unit (6) acquires the detection information of at least one detection object (700, 711, 721, 731 to 733, 741 to 746) exists in target space (400). Display unit (40) displays virtual images (311, 321, 331 to 333, 341, 351, 352) in target space (400). Controller (5) controls the display of display unit (40). In target space (400), at least one detection area (401 to 404) is provided in the lateral direction that intersects with each of the longitudinal direction and the vertical direction. At least one detection object includes first detection object (711, 721, 731, 741, 742, 744 to 746) that exists closest to the mobile body and second detection object (732) that has the shortest time to collision with the mobile body. The method for controlling sets at least one of first detection object (711, 721, 731, 741, 742, 744 to 746) and second detection object (732) in the detection object that exists in the detection area as the display object, based on the detection information. Controller (5) causes display unit (40) to display virtual image (311, 321, 331 to 333, 341, 351, 352) corresponding to the display object.

The computer-readable recording medium of an eleventh aspect is a non-transitory computer-readable recording medium storing a program causing the computer system to execute the method for controlling display system (10) of the tenth aspect.

Mobile body (100) of a twelfth aspect includes: body (109); display system (10) according to any one of the first to eighth aspects, display system (10) being mounted on body (109); reflection member (101); and vehicle drive portion (104) that moves body (109). Reflection member (101) is fixed to body (109) and reflects the light emitted from display unit (40) to display virtual image (311, 321, 331 to 333, 341, 351, 352) in target space (400).

According to the twelfth aspect, it is possible to provide mobile body (100) that makes the display easy for user (200) to understand.

The configurations according to the second to seventh aspects are not essential configurations for display system (10), and it is possible to appropriately omit these configurations.

This disclosure relates to a display system, an information presentation system, a method for controlling a display system, a computer-readable recording medium, and a mobile body, and particularly is useful as a display system, an information presentation system, a method for controlling a display system, a computer-readable recording medium, and a mobile body that display a virtual image in a target space.

What is claimed is:
1. A display system for use in a mobile body, the display system comprising:
projector that projects a plurality of virtual images onto a reflection member;
at least one processor; and at least one memory coupled to the at least one processor, the at least one memory storing at least one program that, when executed by the at least one processor, causes the display system to:
- acquire detection information of a plurality of detection objects that exist in a detection area and position information of the mobile body;
- divide the detection area into a plurality of detection areas based on the position information;
- extract a first detection object that exists closest to the mobile body among the plurality of detection objects in each detection area of the plurality of detection areas based on the detection information; and
- project, via the projector, a plurality of first virtual images of the plurality of virtual images corresponding to a first display object in each detection area of the plurality of detection areas.

2. The display system according to claim 1, wherein the at least one memory storing the at least one program that, when executed by the at least one processor, further causes the display system to:
- change the plurality of first virtual images in each detection area of the plurality of detection areas to be different from each other.

3. The display system according to claim 1, wherein: the position information includes a kind of traffic route along which mobile body goes, and
- the detection area is divided into the plurality of detection areas according to the kind of the traffic route.

4. The display system according to claim 3, wherein the kind of the traffic route includes one of a travel lane on which the mobile body travels, an opposite lane, or a sidewalk.

5. The display system according to claim 1, wherein:
- each virtual image of the first plurality of virtual images is a rod-shaped marker that is long in a direction perpendicular to a direction in which the mobile body goes, and
- each virtual image of the plurality of the first virtual images is projected in front of the first display object such that each virtual image of the plurality of the first virtual images is viewable to a user of the mobile body.

6. The display system according to claim 1, wherein the at least one memory storing the at least one program that, when executed by the at least one processor, further causes the display system to:
- project a viewing distance with each virtual image of the plurality of the first virtual images in accordance with a distance to the first display object.

7. The display system according to claim 1, wherein the at least one memory storing the at least one program that, when executed by the at least one processor, further causes the display system to:
- extract a second detection object that has a shortest time to collision with the mobile body among the plurality of detection objects, in each of the plurality of the detection area based on the detection information; and
- project a plurality of second virtual images of the plurality of virtual images, each virtual image of the plurality of the second virtual images corresponding to the second display object in each of the plurality of the detection area.

8. The display system according to claim 1, wherein: the reflection member is a windshield of the mobile body and is optically transparent, and
the reflection member reflects light emitted from the projector such that the plurality of the first virtual images are viewable to the user.

9. An information presentation system comprising:
- a detection system that detects detection information of a plurality of detection objects that exist in a detection area and position information of the mobile body;
- a projector that projects a plurality of virtual images onto a reflection member;
- at least one processor; and
at least one memory coupled to the at least one processor, the at least one memory storing at least one program that, when executed by the at least one processor, causes the information presentation system to:
- acquire the detection information and the position information from the detection system;
- divide the detection area into a plurality of detection areas based on the position information;
- extract a first detection object that exists closest to the mobile body among the plurality of detection objects in each detection area of the plurality of the detection area based on the detection information; and
- project a plurality of first virtual images of the plurality of virtual images, each virtual image of the plurality of the first virtual images corresponding to a first display object in each detection area of the plurality of detection areas.

10. The information presenting system according to claim 9, wherein:
the at least one memory storing the at least one program that, when executed by the at least one processor, further causes the information presentation system to:
- extract a second detection object that has a shortest time to collision with the mobile body among the plurality of detection objects, in each detection area of the plurality of detection areas, based on the detection information; and
- project a plurality of second virtual images of the plurality of virtual images, each virtual image of the plurality of the second virtual images corresponding to the second display object in each detection area of the plurality of detection areas.

11. A display control method for a mobile body, the method comprising:
- acquiring detection information of a plurality of detection objects that exist in a detection area and position information of the mobile body;
- dividing the detection area into a plurality of detection areas based on the position information;
- extracting a first detection object that exists closest to the mobile body in each detection area of the plurality of detection areas based on the detection information
- projecting a plurality of first virtual images, each virtual image of the plurality of first virtual images corresponding to a first display object in each detection area of the plurality of detection areas.

12. The display control method according to claim 11, further comprising:
- extracting a second detection object that has a shortest time to collision with the mobile body among the plurality of detection objects, in each detection area of the plurality of detection areas, based on the detection information; and
- projecting a plurality of second virtual images of the plurality of virtual images, each virtual image of the plurality of second virtual images corresponding to the second display object in each detection area of the plurality of the detection areas.

13. A non-transitory computer-readable recording medium storing a program causing a computer system to execute a method for controlling a display system, method comprising:
   acquiring detection information of a plurality of detection objects that exist in a detection area and position information of a mobile body;
   dividing the detection area into a plurality of detection areas based on the position information;
   extracting a first detection object that exists closest to the mobile body in each detection area of the plurality of detection areas based on the detection information; and
   projecting a plurality of first virtual images, each virtual image of the plurality of first virtual images corresponding to a first display object in each detection area of the plurality of detection areas.

14. The non-transitory computer-readable recording medium according to claim 13, wherein the method further comprises:
   extracting a second detection object that has a shortest time to collision with the mobile body among the plurality of detection objects, in each detection area of the plurality of detection area, based on the detection information; and
   projecting a plurality of second virtual images of the plurality of virtual images, each virtual image of the plurality of the second virtual images corresponding to the second display object in each detection area of the plurality of the detection areas.

15. A mobile body comprising:
   a body;
   the display system mounted on the body the display system comprising:
      a projector that projects a plurality of virtual images onto a reflection member;
      at least one processor; and
      at least one memory coupled to the at least one processor, the at least one memory storing at least one program that, when executed by the at least one processor, causes the display system to:
      acquire detection information of a plurality of detection objects that exist in a detection area and position information of the mobile body;
      divide the detection area into a plurality of detection areas based on the position information;
      extract a first detection object that exists closest to the mobile body among the plurality of detection objects, in each of the plurality of the detection area based on the detection information; and
      project a plurality of first virtual images, each of the plurality of the first virtual images corresponding to a first display object in each of the plurality of the detection areas, and
   a drive that moves the body, wherein the reflection member that is fixed to the body and contains optical transparency, the reflection member reflecting light emitted from projector to allow the user to view the plurality of first virtual images.

16. The mobile body according to claim 15, wherein the at least one memory storing the at least one program that, when executed by the at least one processor, further causes the display system to:
   extract a second detection object that has a shortest time to collision with the mobile body among the plurality of detection objects, in each detection area of the plurality of detection areas, based on the detection information; and
   project a plurality of second virtual images of the plurality of virtual images, each virtual image of the plurality of the second virtual images corresponding to the second display object in each detection area of the plurality of detection areas.

* * * * *